United States Patent [19]
Bretaudeau et al.

[11] Patent Number: 5,474,753
[45] Date of Patent: Dec. 12, 1995

[54] PREPARATION OF CRYSTALLINE 4A ZEOLITES

[75] Inventors: Dominique Bretaudeau, Livourne, Italy; François Delprato, Aubervilliers; Marc Malassis, La Ciotat, both of France

[73] Assignee: Laviosa Rhone-Poulenc, Livourne, Italy

[21] Appl. No.: 243,076

[22] Filed: May 16, 1994

Related U.S. Application Data

[63] Continuation of Ser. No. 790,172, Nov. 12, 1991, abandoned.

[30] Foreign Application Priority Data

Nov. 9, 1990 [FR] France ................................ 90 13904

[51] Int. Cl.$^6$ .................................................. C01B 39/14
[52] U.S. Cl. ........................................ 423/700; 423/DIG. 24
[58] Field of Search ............................... 423/700, DIG. 24

[56] References Cited

U.S. PATENT DOCUMENTS

| | | | |
|---|---|---|---|
| 2,958,579 | 11/1960 | McCormick et al. | 423/700 |
| 3,425,800 | 2/1969 | Hirsh | 423/DIG. 24 |
| 4,073,867 | 2/1978 | Roebke et al. | 423/429 |
| 4,263,266 | 4/1981 | Michel et al. | 423/700 |
| 4,274,975 | 6/1981 | Corkill et al. | 252/140 |
| 4,278,649 | 7/1981 | Christophliemk et al. | 423/328.1 |
| 4,303,627 | 12/1981 | Strack et al. | 423/DIG. 24 |
| 4,303,628 | 12/1981 | Strack et al. | 423/710 |
| 4,303,629 | 12/1981 | Strack et al. | 423/711 |
| 4,305,916 | 12/1981 | Strack et al. | 423/DIG. 24 |
| 4,314,979 | 2/1982 | Deabridges | 423/700 |
| 4,551,322 | 11/1985 | Strack et al. | 423/DIG. 24 |
| 4,649,036 | 3/1987 | Pastorello et al. | 423/700 |
| 4,661,334 | 4/1987 | Latourrette et al. | 423/710 |

FOREIGN PATENT DOCUMENTS

| | | |
|---|---|---|
| 1148919 | 6/1983 | Canada . |
| 0149929 | 7/1985 | European Pat. Off. . |
| 2324576 | 4/1977 | France . |
| 2392932 | 12/1978 | France . |
| 57-3713 | 1/1982 | Japan . |
| 57-111226 | 7/1982 | Japan . |
| 57-129819 | 8/1982 | Japan . |
| 2043043 | 10/1980 | United Kingdom . |
| 2051024 | 1/1981 | United Kingdom . |

*Primary Examiner*—Mark L. Bell
*Assistant Examiner*—David Sample
*Attorney, Agent, or Firm*—Burns, Doane, Swecker & Mathis

[57] ABSTRACT

Crystalline 4A zeolites having high calcium ion exchange capacity, well adapted as builder materials for detergent compositions, are prepared by directly admixing an aqueous sodium silicate solution with a first aqueous sodium aluminate solution in a first reaction vessel to form a hydrogel therefrom, and transferring the hydrogel thus formed to a discrete crystallization zone and therein contacting such hydrogel with a crystallization-effecting amount of a second aqueous sodium aluminate solution to convert same into a crystalline 4A zeolite, and, advantageously, filtering, washing and optionally drying such crystalline 4A zeolite.

23 Claims, No Drawings

PREPARATION OF CRYSTALLINE 4A ZEOLITES

This application is a continuation of application Ser. No. 07/790,172, filed Nov. 12, 1991 now abandoned.

BACKGROUND OF THE INVENTION

Field of the Invention

The present invention relates to the preparation of crystalline 4A zeolites having a high exchange capacity for calcium ions and to the use of such zeolites as adjuvants ("builders") in detergent compositions.

SUMMARY OF THE INVENTION

Briefly, the present invention features a continuous process for the preparation of crystalline 4A zeolites, by directly mixing, at a temperature higher than ambient temperature, an aqueous sodium silicate solution with an aqueous sodium aluminate solution in a non-stirred reactor, to thus form a hydrogel, and next crystallizing such hydrogel at a temperature higher than ambient temperature and filtering, washing and optionally drying said crystallized hydrogel, which process comprises continuously introducing the aqueous sodium silicate and sodium aluminate solutions into the non-stirred reactor, at respective flow rates such that the ratio of the flow rate of aluminate solution/flow rate of silicate solution ranges from about 4 and 8 and preferably from about 5 to 7, and in amounts such that the composition of the hydrogel formed is constant and corresponds to the following formula, expressed in the molar fractions:

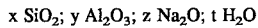

$$x\ SiO_2;\ y\ Al_2O_3;\ z\ Na_2O;\ t\ H_2O$$

wherein $0.5 < x/y < 3$ and preferably $1 < x/y < 2$, $2 < z/y < 7$ and preferably $3 < z/y < 6$, $50 < t/y < 400$ and preferably $75 < t/y < 200$, and contacting the hydrogel formed with a base stock of an aqueous sodium aluminate solution containing on the order of 2% to 7% by weight, preferably on the order of 3% to 6% by weight of $Al_2O_3$ and on the order of 8% to 14%, preferably on the order of 9% to 13% by weight of $Na_2O$, said base stock being present in an amount such that the product formed by crystallization corresponds to the following formula expressed in molar fractions:

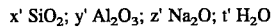

$$x'\ SiO_2;\ y'\ Al_2O_3;\ z'\ Na_2O;\ t'\ H_2O$$

wherein $1.5 < x'/y' < 3$ and preferably $1.8 < x'/y' < 2.1$, $0.5 < z'/y' < 1.5$ and preferably $0.8 < z'/y' < 1.2$,
and $3 < t'/y' < 6$ and preferably $4 < t'/y' < 5$.

DETAILED DESCRIPTION OF THE PREFERRED EMBODIMENTS OF THE INVENTION

More particularly according to the present invention, the direct mixing operation may be carried out in any non-stirred reactor, the geometry of which permits a linear speed of the mixture of silicate and aluminate solutions on the order of 7 to 15 m/s to be attained, for example a tubular reactor, in particular of the Venturi type.

This mixing stage is carried out at a temperature higher than ambient temperature; it is advantageously carried out by introducing a sodium silicate solution, the temperature of which is on the order of 40° to 90° C., preferably on the order of 50° to 80° C., and a sodium aluminate solution at a temperature on the order of 40° to 100° C., preferably on the order of 50° to 90° C.

This mixing stage generally requires on the order of 1 to 60 seconds.

The hydrogel formed at the outlet of the non-stirred reactor discharges into an open stirred reactor (for example a reactor fitted with a gentle stirrer blade, an anchor stirrer, etc.).

A base stock of sodium aluminate in aqueous solution has previously been introduced into said stirred reactor; the aluminate solution constituting the base stock may represent on the order of 5% to 20% of the total amount of aluminate required for the hydrothermal synthesis in order to produce the desired final product.

The temperature of said base stock is typically on the order of 50° to 110° C., preferably on the order of 50° to 100° C.

The crystallization operation is carried out at a temperature which results from the temperatures of the above three fluids; this is generally on the order of 45° to 95° C. The inertia of the system ensures that this temperature can be maintained for a crystallization time period which can range from 30 min to 30 hours, depending on the temperature of said fluids and the volume of the base stock. However, if necessary, means for heating the crystallization reactor may be provided. During the crystallization stage, the reaction mixture may be recycled by means of a pump (in order to improve the homogeneity of the system) either continuously or sequentially.

After crystallization, the product collected is filtered, washed with demineralized water to remove the excess sodium hydroxide and sodium aluminate and then dried until it contains about 20% of free water.

In the anhydrous form, the zeolite produced has the formula $2\ SiO/Al_2O_3/Na_2O$. It is of high phase purity (virtual absence of hydroxysodalite).

It is in the form of a powder which has an average diameter on the order of 0.5 to 5 microns and has a high exchange capacity and kinetics for calcium ions, which makes it particularly valuable as an adjuvant ("builder") for detergents.

In order to further illustrate the present invention and the advantages thereof, the following specific examples are given, it being understood that same are intended only as illustrative and in nowise limitative.

EXAMPLE 1

The following materials were introduced into a Venturi tube, the geometry of which permitted a linear speed of the flow rates of 11 m/s to be attained:

(i) at a flow rate of 90 m³/h, 19.5 m³ of an aqueous sodium aluminate solution containing 4.95% by weight of $Al_2O_3$ and 11.16% by weight of $Na_2O$, at a temperature of 59° C., and (ii) at a flow rate of 14.3 m³/h, 2.93 m³ of an aqueous sodium silicate solution containing 28.2% by weight of $SiO_2$ and 14.7% by weight of $Na_2O$, at a temperature of 58.3° C.

The hydrogel thus formed was discharged into a 25 m³ crystallizer stirred by means of an anchor stirrer and containing 3.5 m³ of an aqueous sodium aluminate solution containing 4.95% by weight of $Al_2O_3$ and 11.16% by weight of $Na_2O$, at a temperature of 87° C.

The reaction mixture, the temperature of which reached 66° C. (without external supply of heat) was maintained under gentle stirring for 240 min.

The suspension obtained was then filtered through a filter of the Pannevis® type (marketed by PANNEVIS) and washed first with an aqueous sodium hydroxide solution having a concentration of 0.05% by weight and, secondly, with demineralized water, the total volume of solution and water being 5 m$^3$.

The slurry obtained, which had a solids content of 52%, was then dried in an apparatus of the spin-flash type.

The powder obtained was a 4A zeolite of the LTA type having:

(a) a crystallinity of 99%, (b) an average diameter of 1.9 microns; no crystals larger than 11 microns were observed, (c) a weight loss on ignition at 800° C. of 19.48%, and (d) an exchange capacity for calcium ions of 299 mg of CaCO$_3$/g of anhydrous zeolite.

The exchange capacity was determined after 15 min, in a 3 g/l NaCl medium, using an electrode specific for calcium (ORION-93-20). The initial calcium concentration was $5 \times 10^{-3}$ mol l$^{-1}$ and the zeolite concentration was 1 g (anhydrous)/l. The temperature was 25° C.

EXAMPLE 2

The procedure described in Example 1 was repeated, but with the following modifications:
Introduction of the solutions into the Venturi tube:

(i) 16.5 m$^3$ of sodium aluminate solution (5.1% by weight of Al$_2$O$_3$ and 12.24% by weight of Na$_2$O) at 76° C. at a flow rate of 78 m$^3$/h, and (ii) 2.8 m$^3$ of sodium silicate solution (29.9% by weight of SiO$_2$ and 14.9% by weight of Na$_2$O) at 74° C. at a flow rate of 12.3 m$^3$/h.

Crystallization:

(i) base stock: 3.4 m$^3$ of sodium aluminate solution (5.1% by weight of Al$_2$O$_3$ and 12.24% by weight of Na$_2$O) at 72.4° C., (ii) temperature (without external heating): 77.4° C., (iii) residence time: 60 min.

Characteristics of the zeolite:

(a) 4A zeolite of LTA type, (b) crystallinity: 95%, (c) average particle diameter: 2.58 microns, (d) weight loss on ignition at 800° C.: 19.7%, (e) exchange capacity for calcium ions: 295 mg CaCO$_3$/g.

EXAMPLE 3

The procedure described in Example 1 was repeated, but with the following modifications:
Introduction of the solutions into the Venturi tube:

(i) 17.1 m$^3$ of aqueous sodium aluminate solution (5.3% by weight of Al$_2$O$_3$ and 11.17% by weight of Na$_2$O) at 80.5° C. at a flow rate of 50 m$^3$/h, and (ii) 2.9 m$^3$ of sodium silicate solution (30.3% by weight of SiO$_2$ and 14.7% by weight of Na$_2$O) at 79.2° C. at a flow rate of 7.9 m$^3$/h.

Crystallization:

(i) base stock: 3.3 m$^3$ of sodium aluminate solution (5.3% by weight of Al$_2$O$_3$ and 11.17% by weight of Na$_2$O) at 80° C., (ii) temperature (without external heating): 83.7° C., (iii) the reaction mixture was recycled during the crystallization stage using a pump at a flow rate of approximately 100 m$^3$/h in order to improve the homogeneity of the system, (iv) residence time: 150 min.

Characteristics of the zeolite:

(a) 4A zeolite of LTA type, (b) crystallinity: 95%, (c) average particle diameter: 3.2 microns with a maximum diameter of 15 microns, (d) weight loss on ignition at 800° C.: 19.9%, (e) exchange capacity for calcium ions: 300 mg CaCO$_3$/g.

EXAMPLE 4 (Comparative):

The procedure described in Example 1 was repeated, but with the following modifications:
Introduction of the solutions into the Venturi tube:

(i) 9 m$^3$ of sodium aluminate solution (5.7% by weight of Al$_2$O$_3$ and 12.4% by weight of Na$_2$O) at 64.5° C. at a flow rate of 82 m$^3$/h, and (ii) 1.4 m$^3$ of sodium silicate solution (28.5% by weight of Al$_2$O$_3$ and 14.34% by weight of Na$_2$O) at 75.5° C. at a flow rate of 13.9 m$^3$/h.

Crystallization:

(i) no base stock, (ii) initial crystallization temperature: 68° C., (iii) residence time: 22 hours; the temperature decreased to about 55° C. during this period.

It was found that a long residence time was necessary to achieve good crystallization of the product (22 hours instead of 1 to 4 hours in the preceding examples).

It was also found that the product filtered less effectively because it was less fluid.

Characteristics of the zeolite:

(a) 4A zeolite of LTA type, (b) crystallinity: 99%, (c) average diameter: 1.8 microns, (d) weight loss on ignition at 800° C.: 26%, (e) exchange capacity for calcium ions: 306 mg CaCO$_3$/g.

EXAMPLE 5

The procedure described in Example 1 was repeated, but with the following modifications:
Introduction of the solutions into the Venturi tube:

(i) 62.5 liters of sodium aluminate solution (11.58% by weight of Al$_2$O$_3$ and 5.3% by weight of Na$_2$O) at 62.3° C. at a flow rate of 375 l/h, and (ii) 10 l of sodium silicate solution (28.6% by weight of SiO$_2$ and 15.2% by weight of Na$_2$O) at 62.6° C. at a flow rate of 60 l/h.

Crystallization:

(i) 100 liter crystallizer provided with an anchor stirrer, (ii) base stock: 10.5 l of sodium aluminate solution (11.58% by weight of Al$_2$O$_3$ and 5.3% by weight of Na$_2$O) at 80° C., (iii) temperature (with external heating): maintained at 75° C., (iv) residence time: 75 min.

Characteristics:

(a) 4A zeolite of LTA type, (b) crystallinity: 99%, (c) average diameter: 6.3 microns, (d) weight loss on ignition at 800° C.: 17.65%, (e) exchange capacity for calcium ions: 308 mg CaCO$_3$/g.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A continuous process for the preparation of a crystalline 4A zeolite having a high exchange capacity for calcium ions, comprising directly mixing an aqueous sodium silicate solution at a temperature greater than ambient with a first volume of an aqueous sodium aluminate solution at a temperature greater than ambient into a non-stirred reactor, to form a hydrogel therefrom within about 60 seconds of mixing, and transferring said hydrogel to an open, stirred reactor into which has been introduced a second volume of said aqueous sodium aluminate solution at a temperature greater than ambient, to convert said hydrogel into said crystalline 4A zeolite; wherein the aqueous solutions of sodium silicate and sodium aluminate are continuously introduced into said non-stirred reactor at respective flow rates such that the ratio of the flow rate of aluminate solution to the flow rate of silicate solution ranges from about 4 to 8; and wherein said crystalline 4A zeolite has the following formula, expressed in molar fractions:

x' SiO$_2$; y' Al$_2$O$_3$; z' Na$_2$O; t' H$_2$O where $1.5<x'/y'<3$, $0.5<z'/y'<1.5$, $3<t'/y'<6$.

2. The process as defined by claim 1, further comprising filtering, washing and optionally drying said crystalline 4A zeolite.

3. The process as defined by claim 1, wherein the ratio of the flow rate of aluminate solution to the flow rate of silicate solution ranges from about 5 to 7; and said crystalline 4A zeolite has the following formula, expressed in molar fractions:

x' SiO$_2$; y' Al$_2$O$_3$; z' Na$_2$O; t' H$_2$O where $1.8<x'/y'<2.1$, $0.8<z'/y'<1.2$, $4<t'/y'<5$.

4. The process as defined by claim 1, wherein a linear speed of the mixture of aqueous sodium silicate and sodium aluminate solutions flowing through said non-stirred reactor ranges from about 7 to 15 m/s.

5. The process as defined by claim 1, wherein the temperature of said first volume of sodium silicate solution ranges from about 40° C. to 90° C. and the temperature of said sodium aluminate solution ranges from about 40° C. to 100° C., and the temperature of said second volume of sodium aluminate solution ranges from about 50° C. to 110° C.

6. The process as defined by claim 1, wherein the temperature of crystallization ranges from about 45° to 95° C.

7. The continuous process as defined in claim 1, wherein said non-stirred reactor is a Venturi tube.

8. The process of claim 1, wherein said aqueous sodium aluminate solution comprises about 2–7% by weight of Al$_2$O$_3$ and about 8–14% by weight of Na$_2$O.

9. The process of claim 1, wherein said aqueous sodium aluminate solution comprises about 3–6% by weight of Al$_2$O$_3$ and about 9–13% by weight of Na$_2$O.

10. The process as defined by claim 1, wherein said aqueous sodium silicate solution comprises about 28% to about 31% by weight of SiO$_2$ and about 12% to about 16% by weight of Na$_2$O.

11. The process as defined by claim 1, wherein said hydrogel converts into said crystalline 4A zeolite within about 4 hours.

12. The process as defined by claim 1, wherein the ratio of the flow rate of aluminate solution to the flow rate of silicate solution ranges from about 5 to 7; said crystalline 4A zeolite has the following formula, expressed in molar fractions:

x' SiO$_2$; y' Al$_2$O$_3$; z' Na$_2$O; t' H$_2$O where $1.8<x'/y'<2.1$, $0.8<z'/y'<1.2$, $4<t'/y'<5$;

said aqueous sodium aluminate solution contains about 3–6% by weight of Al$_2$O$_3$ and about 9–13% by weight of Na$_2$O; and said hydrogel has the following formula, expressed in molar fractions:

x SiO$_2$; y Al$_2$O$_3$; z Na$_2$O; t H$_2$O where $1<x/y<2$, $3<z/y<6$, $75<t/y<200$.

13. The process as defined by claim 12, wherein the temperature of said first volume of sodium silicate solution ranges from about 40° C. to 90° C., the temperature of said sodium aluminate solution ranges from about 40° C. to 100° C., and the temperature of said second volume of sodium aluminate solution ranges from about 50° C. to 110° C.

14. The process as defined by claim 13, wherein said crystalline 4A zeolite forms without external heating of said stirred react.

15. A continuous process for the preparation of a crystalline 4A zeolite having a high exchange capacity for calcium ions, comprising directly mixing an aqueous sodium silicate solution at a temperature greater than ambient with a first volume of an aqueous sodium aluminate solution at a temperature greater than ambient into a non-stirred reactor, to form a hydrogel therefrom, and transferring said hydrogel to an open, stirred reactor into which has been introduced a second volume of said aqueous sodium aluminate solution at a temperature greater than ambient, to convert said hydrogel into said crystalline 4A zeolite; wherein the aqueous solutions of sodium silicate and sodium aluminate are continuously introduced into said non-stirred reactor at respective flow rates such that the ratio of the flow rate of aluminate solution to the flow rate of silicate solution ranges from about 4 to 8; and wherein said crystalline 4A zeolite has the following formula, expressed in molar fractions:

x' SiO$_2$; y' Al$_2$O$_3$; z' Na$_2$O; t' H$_2$O where $1.5<x'/y'<3$, $0.5<z'/y'<1.5$, $3<t'/y'<6$.

16. The process as defined by claim 15, wherein said crystalline 4A zeolite forms without external heating of said stirred reactor.

17. The process as defined by claim 15, wherein said hydrogel has the following formula, expressed in molar fractions:

x SiO$_2$; y Al$_2$O$_3$; z Na$_2$O; t H$_2$O where $0.5<x/y<3$, $2<z/y<7$, $50<t/y<400$.

18. The process as defined by claim 15, wherein said hydrogel has the following formula, expressed in molar fractions:

x SiO$_2$; y Al$_2$O$_3$; z Na$_2$O; t H$_2$O where $1<x/y<2$, $3<z/y<6$, $75<t/y<200$.

19. The process of claim 15, wherein said aqueous sodium aluminate solution comprises about 2–7% by weight of Al$_2$O$_3$ and about 8–14% by weight of Na$_2$O.

20. The process of claim 15, wherein said aqueous sodium aluminate solution comprises about 3–6% by weight of Al$_2$O$_3$ and about 9–13% by weight of Na$_2$O.

21. The process as defined by claim 15, wherein said aqueous sodium silicate solution comprises about 28% to about 31% by weight of $SiO_2$ and about 12% to about 16% by weight of $Na_2O$.

22. The process as defined by claim 15, wherein the ratio of the flow rate of aluminate solution to the flow rate of silicate solution through said non-stirred reactor ranges from about 5 to 7.

23. The process as defined by claim 15, wherein said hydrogel converts into said crystalline 4A zeolite within about 4 hours.

* * * * *

UNITED STATES PATENT AND TRADEMARK OFFICE
CERTIFICATE OF CORRECTION

PATENT NO. : 5,474,753
DATED : December 12, 1995
INVENTOR(S) : Dominique Bretaudeau et al.

It is certified that error appears in the above-indentified patent and that said Letters Patent is hereby corrected as shown below:

Title page, item [73] replace the assignee "Laviosa Rhone-Poulenc" with --ENICHEM AUGUSTA INDUSTRIALE S.R.L.--

Signed and Sealed this

Twenty-second Day of October, 1996

Attest:

BRUCE LEHMAN

*Attesting Officer*  *Commissioner of Patents and Trademarks*